United States Patent
Yaffe

(10) Patent No.: US 9,616,957 B2
(45) Date of Patent: Apr. 11, 2017

(54) MOTORCYCLE FAIRING ADJUSTMENT MEMBER AND ASSEMBLY AND METHOD OF ADJUSTING A MOTORCYCLE FAIRING

(71) Applicant: Paul Yaffe, Phoenix, AZ (US)

(72) Inventor: Paul Yaffe, Phoenix, AZ (US)

( * ) Notice: Subject to any disclaimer, the term of this patent is extended or adjusted under 35 U.S.C. 154(b) by 0 days.

(21) Appl. No.: 14/796,391

(22) Filed: Jul. 10, 2015

(65) Prior Publication Data
US 2017/0008588 A1    Jan. 12, 2017

(51) Int. Cl.
*B62J 17/00*    (2006.01)
*B62J 17/04*    (2006.01)

(52) U.S. Cl.
CPC ..................................... *B62J 17/04* (2013.01)

(58) Field of Classification Search
CPC .................................................... B62J 17/04
USPC ........................................................ 296/78.1
See application file for complete search history.

(56) References Cited

U.S. PATENT DOCUMENTS 3,787,088 A * 1/1974 Dreyer, Sr. .............. B62J 17/00
                                                   280/288.2
5,788,313 A * 8/1998 Willey .................... B62J 17/04
                                                   296/78.1

* cited by examiner

*Primary Examiner* — Joseph D Pape
(74) *Attorney, Agent, or Firm* — Ice Miller LLP

(57) ABSTRACT

A motorcycle fairing adjustment assembly, a motorcycle fairing adjustment member, and a method of adjusting a motorcycle fairing are disclosed. The motorcycle fairing adjustment member includes an outer side configured for mounting to an inner fairing member of a motorcycle, an inner side configured for mounting to a fairing bracket extending longitudinally forward from a neck portion of a motorcycle frame, and an adjustment angle formed by the outer side and the inner side. The adjustment angle adjusts an angle of the inner fairing member relative to the motorcycle frame.

28 Claims, 8 Drawing Sheets

MOTORCYCLE FAIRING ADJUSTMENT MEMBER AND ASSEMBLY AND METHOD OF ADJUSTING A MOTORCYCLE FAIRING

BACKGROUND

Some motorcycles include a front fairing assembly located near a top portion of the front fork assembly. The front fairing assembly may include one or more headlamps, turn signals, gauges or other instrumentation, or one or more mirrors, or a combination thereof, and is designed to be angularly aligned along a preferred longitudinal or horizontal axis. When the rake angle of the neck portion of the motorcycle frame is adjusted, the front fairing assembly may be undesirably tilted or rotated upward relative to the preferred longitudinal or horizontal axis. Further, a front fairing assembly may have an undesirable angular alignment or position without any adjustment of the rake angle of the fork assembly. Such angling or positioning of the front fairing assembly may adversely affect aerodynamic drag of the motorcycle, motorcycle operator or passenger ergonomics and/or safety, and/or aesthetic appearance of the motorcycle.

Therefore, there exists a need for a motorcycle fairing adjustment member, a motorcycle fairing adjustment assembly, and a method of adjusting a motorcycle fairing that conveniently and reversibly reduces aerodynamic drag and improves the ergonomics, safety, and aesthetic appearance of the motorcycle.

SUMMARY

In accordance with an embodiment of the present disclosure, a motorcycle fairing adjustment assembly is provided. The motorcycle fairing adjustment assembly includes a fairing bracket extending longitudinally forward from a neck portion of a motorcycle frame, an inner fairing member disposed adjacent to the fairing bracket, and a fairing adjustment member disposed between the fairing bracket and the inner fairing member. The fairing adjustment member comprises an inner side and an outer side forming an adjustment angle adjusting an angle of the inner fairing member relative to the fairing bracket.

In accordance with an additional embodiment of the present disclosure, a motorcycle fairing adjustment member is provided. The motorcycle fairing adjustment member includes an outer side configured for mounting to an inner fairing member of a motorcycle, an inner side configured for mounting to a fairing bracket extending longitudinally forward from a neck portion of a motorcycle frame, and an adjustment angle formed by the outer side and the inner side. The adjustment angle adjusts an angle of the inner fairing member relative to the fairing bracket.

In accordance with an additional embodiment of the present disclosure, a method of adjusting a motorcycle fairing is provided. The method includes providing a fairing adjustment member having an outer side and an inner side forming an adjustment angle, providing a fairing bracket extending longitudinally forward from a neck portion of a motorcycle frame and having a fairing bracket outer surface, providing an inner fairing member having an inner fairing member inner surface, coupling the fairing adjustment member to the fairing bracket at the fairing bracket outer surface, and coupling the inner fairing member to the fairing adjustment member at the inner fairing member inner surface such that an angle between the inner fairing member inner surface and the fairing bracket outer surface corresponds to the adjustment angle of the fairing adjustment member.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
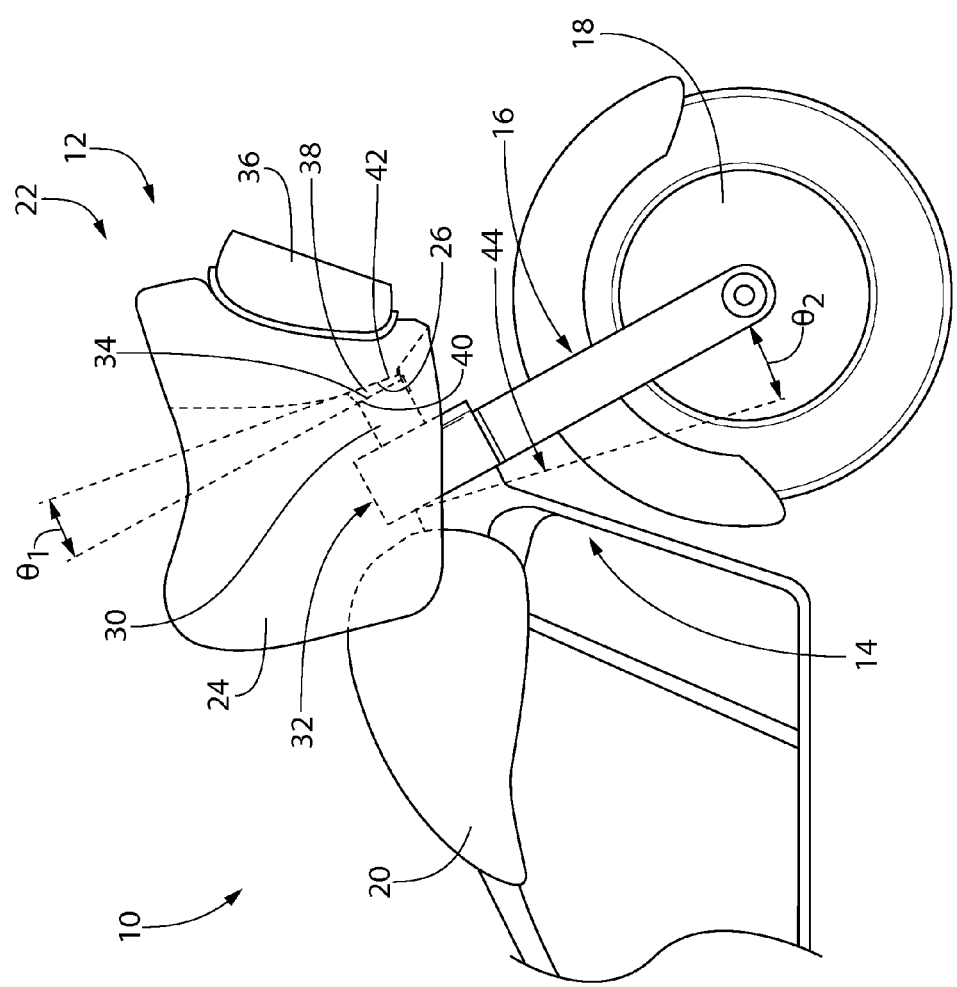
FIG. 1 is a side elevation view of a front portion of a motorcycle having a fairing adjustment assembly in accordance with aspects of the present disclosure.
Figure 2:
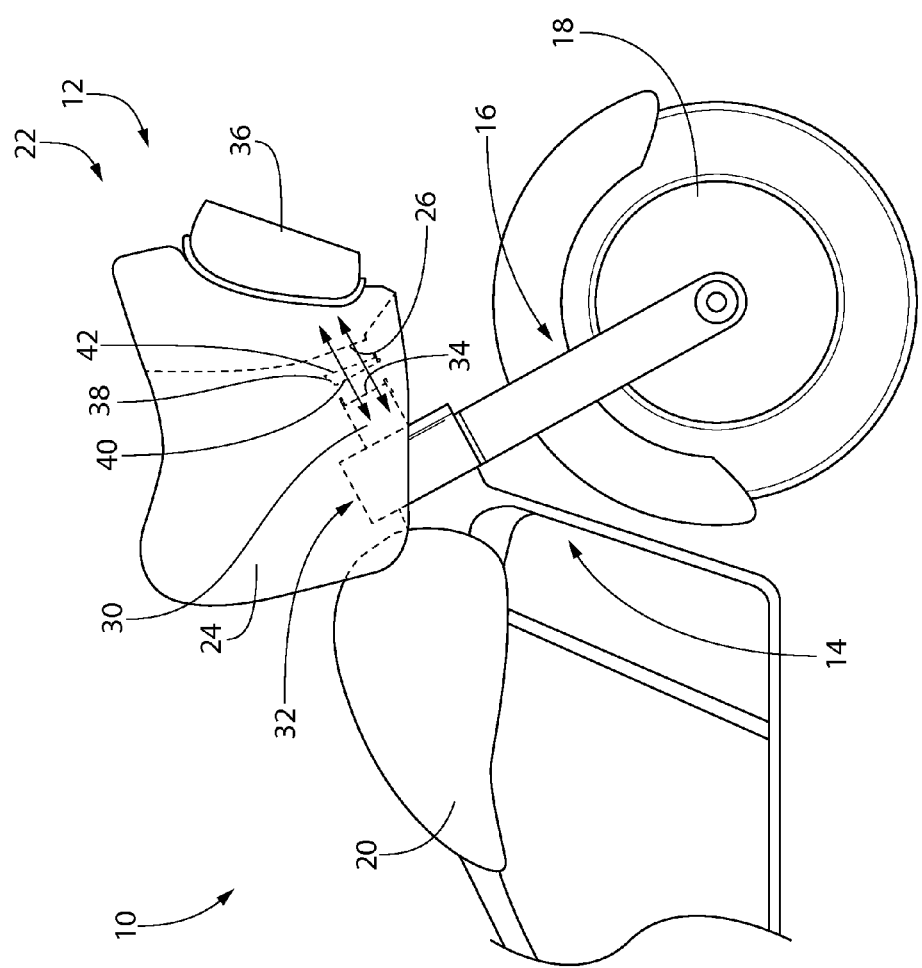
FIG. 2 is a partially exploded side elevation view of a motorcycle having a fairing adjustment assembly in accordance with aspects of the present disclosure.
Figure 3:
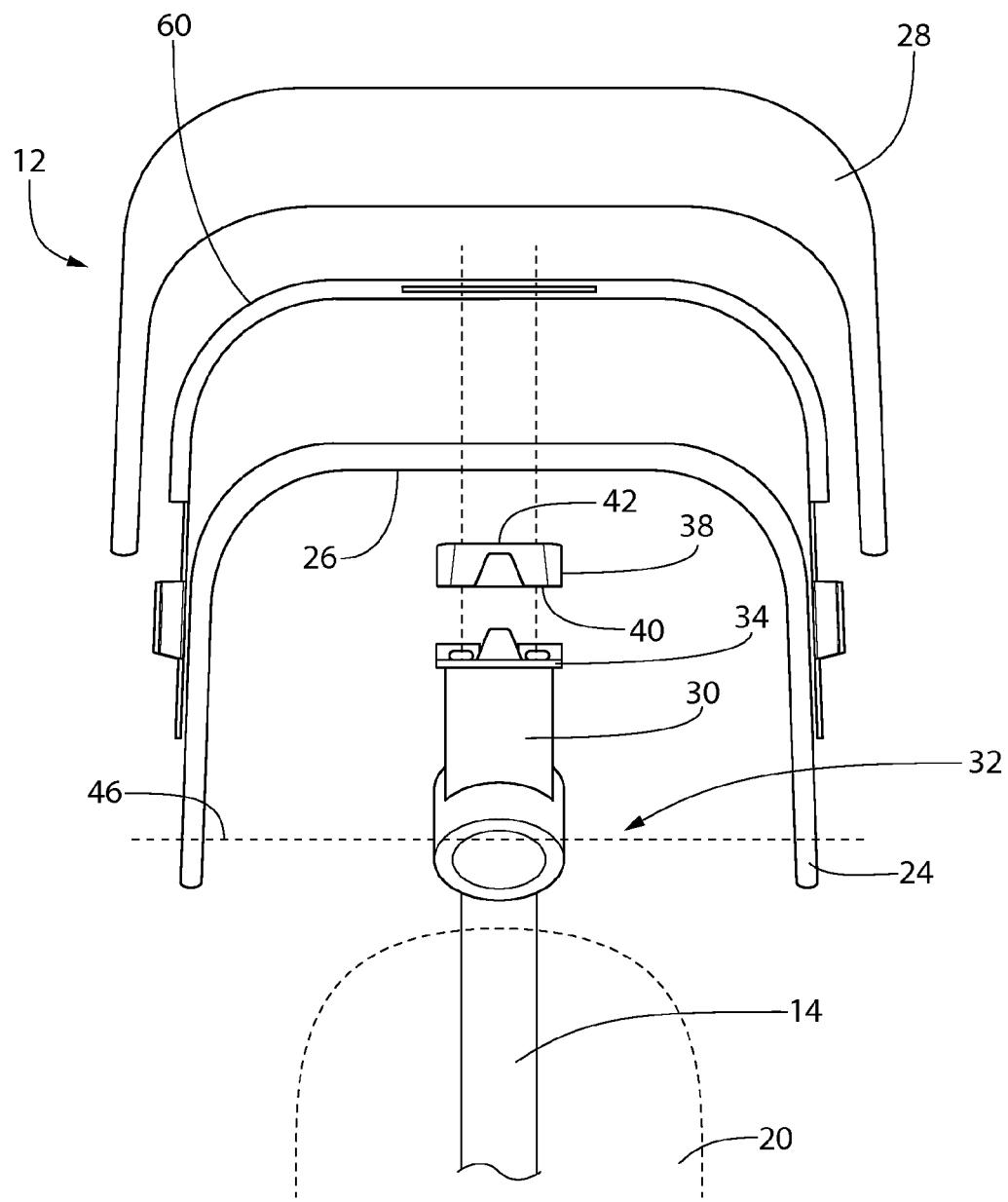
FIG. 3 is a top partially exploded view of a motorcycle having a fairing adjustment assembly in accordance with aspects of the present disclosure.

Referring now to FIGS. 1-3, a motorcycle fairing adjustment assembly 12 is shown. The front portion of a motorcycle 10 includes a frame 14, a fork assembly 16, a front wheel 18, a fuel tank 20, and a motorcycle fairing 22. The motorcycle fairing 22 includes an inner fairing member 24 with an inner fairing member inner surface 26 in the embodiment shown. The motorcycle fairing 22 of an embodiment further includes an outer fairing member 28, as illustrated in FIG. 3. Although the present disclosure describes an inner fairing member 24 and an outer fairing member 28, the existence of an inner fairing member does not require the existence of an outer fairing member and the existence of an outer fairing member does not require the existence of an inner fairing member. A fairing bracket 30 is located at or adjacent to a neck portion 32 of the frame 14 in an embodiment. The fairing bracket 30 includes a fairing bracket outer surface 34. The fairing adjustment assembly 12 of an embodiment includes one or more headlamps 36. In one or more embodiments, the fairing adjustment assembly 12 includes one or more gauges or other instrumentation (not shown), one or more turn signals (not shown), one or more mirrors (not shown), headlight(s) (not shown), and/or a windscreen (not shown). The fairing bracket 30 extends longitudinally forward from the neck portion 32 of the motorcycle frame 14 as shown in FIGS. 1-3. The inner fairing member 24 at least partially wraps around the fairing bracket 30 in the embodiment illustrated in FIG. 3. In another embodiment, the inner fairing member 24 extends longitudinally rearward to partially enclose and/or partially obscure the fairing bracket 30 and/or the neck portion 32 of the frame 14. In another embodiment, the inner fairing 24 is disposed adjacent to the fairing bracket 30 and/or the neck portion 32. The fairing adjustment assembly 12 further includes a fairing adjustment member 38 disposed between the fairing bracket 30 and the inner fairing member 24. The fairing adjustment member 38 of an embodiment is generally wedge-shaped. The fairing adjustment member 38 includes an inner side 40 and an outer side 42 forming an adjustment angle $\theta 1$. The adjustment angle $\theta 1$ adjusts an angle and/or position of the inner fairing member 24 relative to the motorcycle frame 14, neck portion 32, or fairing bracket 30. In one or more additional embodiments, the adjustment angle $\theta 1$ adjusts an angle and/or position of one or more of the outer fairing member 28, gauges or other instrumentation (not shown), one or more turn signals (not shown), one or more mirrors (not shown), headlight(s) (not shown), and/or a windscreen (not shown).

In an embodiment, a rake angle of the neck portion 32 is adjusted or modified to form a rake adjustment angle $\theta 2$ of the neck portion 32, as indicated in FIG. 1. The rake adjustment angle $\theta 2$ of the neck portion 32 refers to the difference between an adjusted or modified rake angle of the motorcycle frame 14 and the original rake angle of the motorcycle frame 14 before adjustment or modification. The rake adjustment angle $\theta 2$ of an embodiment corresponds with the adjustment angle $\theta 1$ of the fairing adjustment member 38. In an embodiment, a method of the present disclosure includes removing the neck portion 32 from the motorcycle frame 14. Such removal may include, without limitation, cutting the neck portion 32 off of the motorcycle frame 14. An unadjusted neck portion position 44 is illustrated in FIGS. 1 and 2 and refers to the position or angle of the neck portion 32 prior to adjustment or modification.

Referring again to FIG. 3, a fairing support member 60 forms part of the motorcycle 10 in an embodiment, as described in the patent application filed on the same date as the present application and entitled "Motorcycle Fairing Support Member and Assembly and Method of Supporting a Motorcycle Fairing" by inventor Paul Yaffe, which is hereby incorporated by reference in its entirety.

The method of an embodiment further includes coupling an adjusted neck portion 32 to the motorcycle frame 14. Such coupling of the adjusted neck portion 32 may include welding, fastening, adhering, or otherwise attaching the same neck portion 32 or a different or additional neck portion 32 to the motorcycle frame 14. The adjusted, different, or additional neck portion 32 includes the rake adjustment angle $\theta 2$ corresponding with the adjustment angle $\theta 1$ of the fairing adjustment member 38. In an embodiment, adjusting the rake angle of the neck portion 32 to form the rake adjustment angle $\theta 2$ comprises rotating the neck portion 32 about a lateral axis 46, as indicated in FIG. 3. The term "corresponding," as recited in the present disclosure, refers to being equal or substantially equal in one embodiment of the present disclosure and having the same angle within five degrees in either direction in another embodiment of the present disclosure.

In accordance with one or more embodiments of the present disclosure, the method further includes coupling the fairing adjustment member 38 to the fairing bracket 30 at the fairing bracket outer surface 34. The method of an embodiment further includes coupling the inner fairing member 24 to the fairing adjustment member 38 at the inner fairing member inner surface 26 such that an angle between the inner fairing member inner surface 26 and the fairing bracket outer surface 34 corresponds to the adjustment angle $\theta 1$ of the fairing adjustment member 38, as illustrated in FIGS. 1 and 2. The outer side 42 of the fairing adjustment member 38 is disposed against the inner fairing member inner surface 26, and the inner side 40 of the fairing adjustment member 38 is disposed against the fairing bracket outer surface 34 in an embodiment.

As shown in FIG. 3, an embodiment of the present disclosure includes a fairing support member 60 positioned adjacent the inner fairing member 24. The fairing support member 60 of an embodiment forms part of a fairing adjustment assembly 12 and includes a contour that substantially corresponds to one or more contours, dimensions, surfaces, or features of the inner fairing member 24 and/or the outer fairing member 28, as illustrated in FIG. 3.

Figure 4:
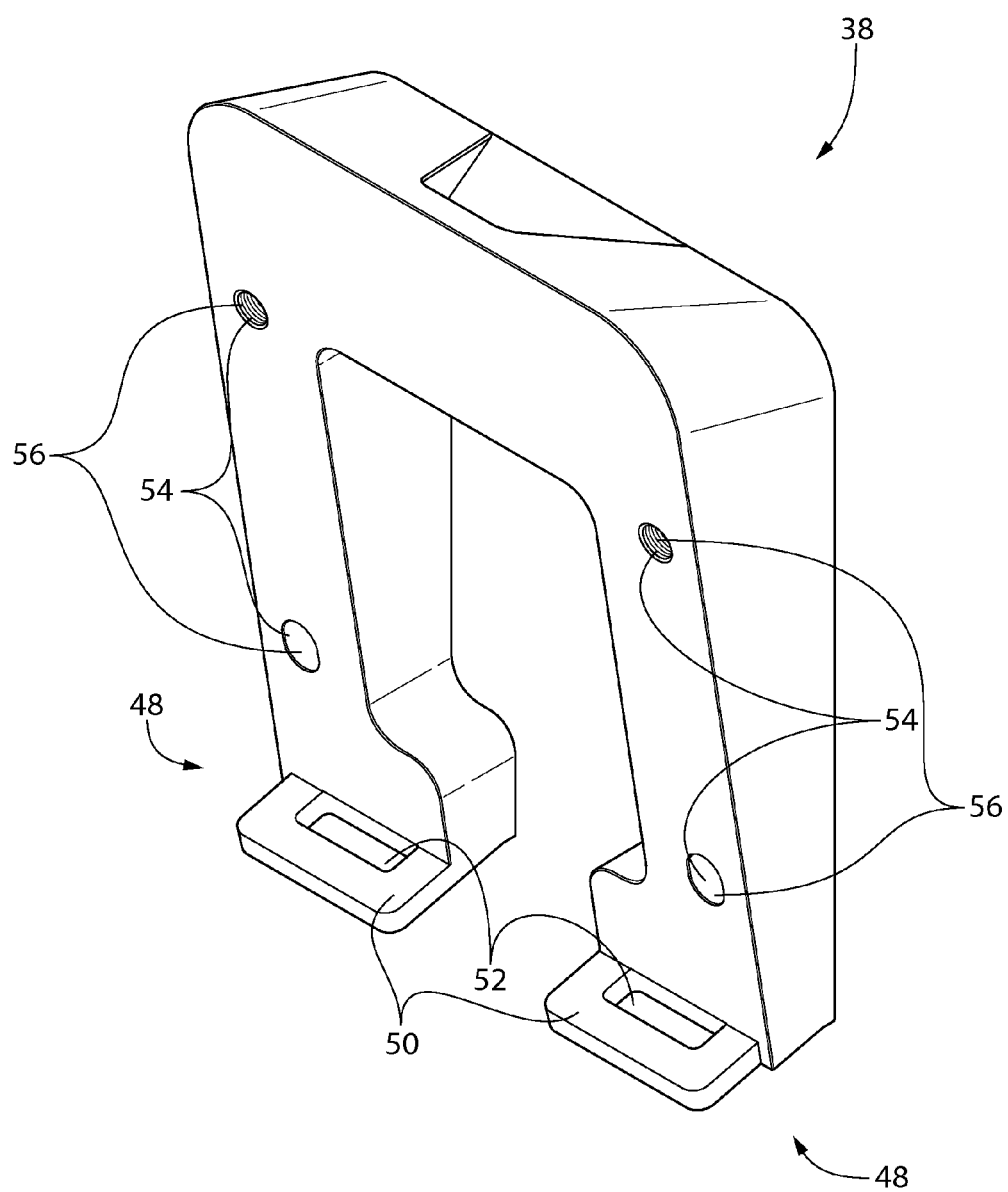
FIG. 4 is a perspective view of a fairing support member in accordance with aspects of the present disclosure.
Figure 5:
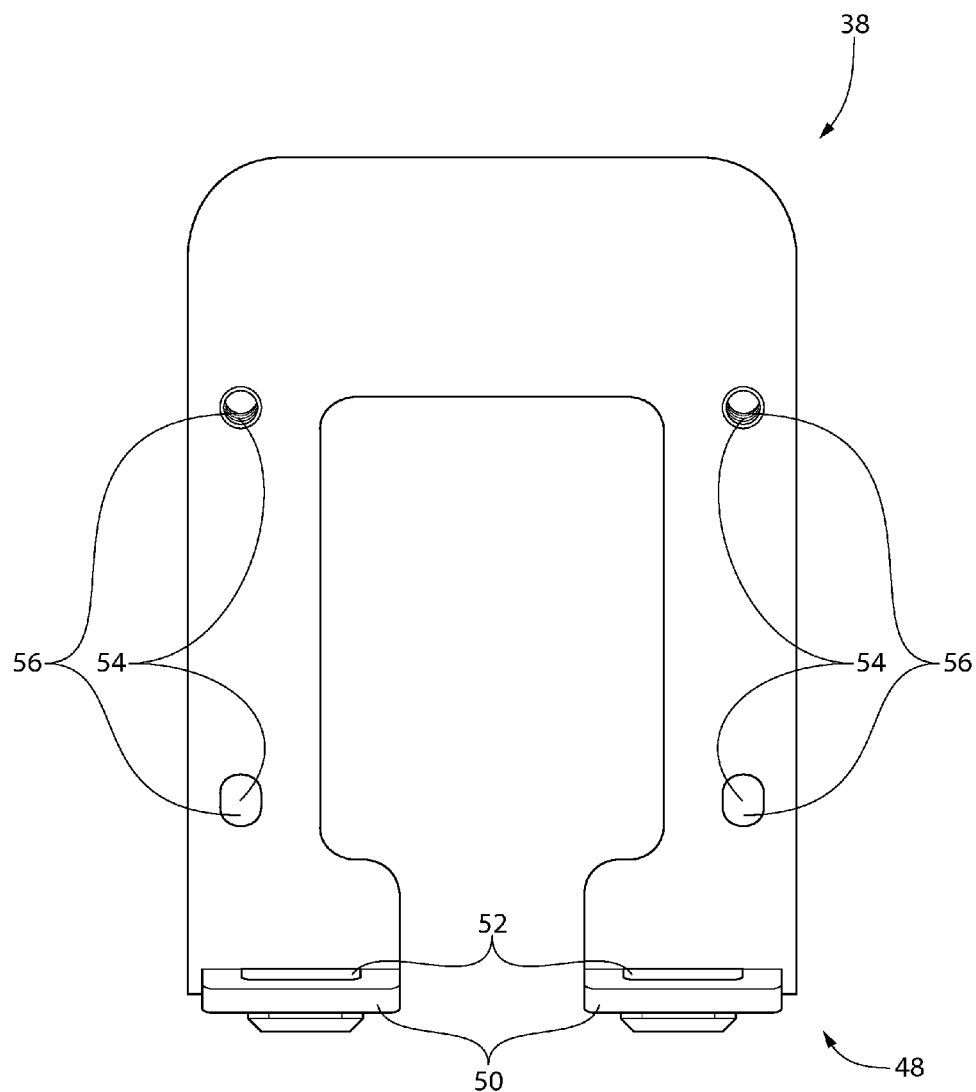
FIG. 5 is a front elevation view of a fairing support member in accordance with aspects of the present disclosure.
Figure 6:
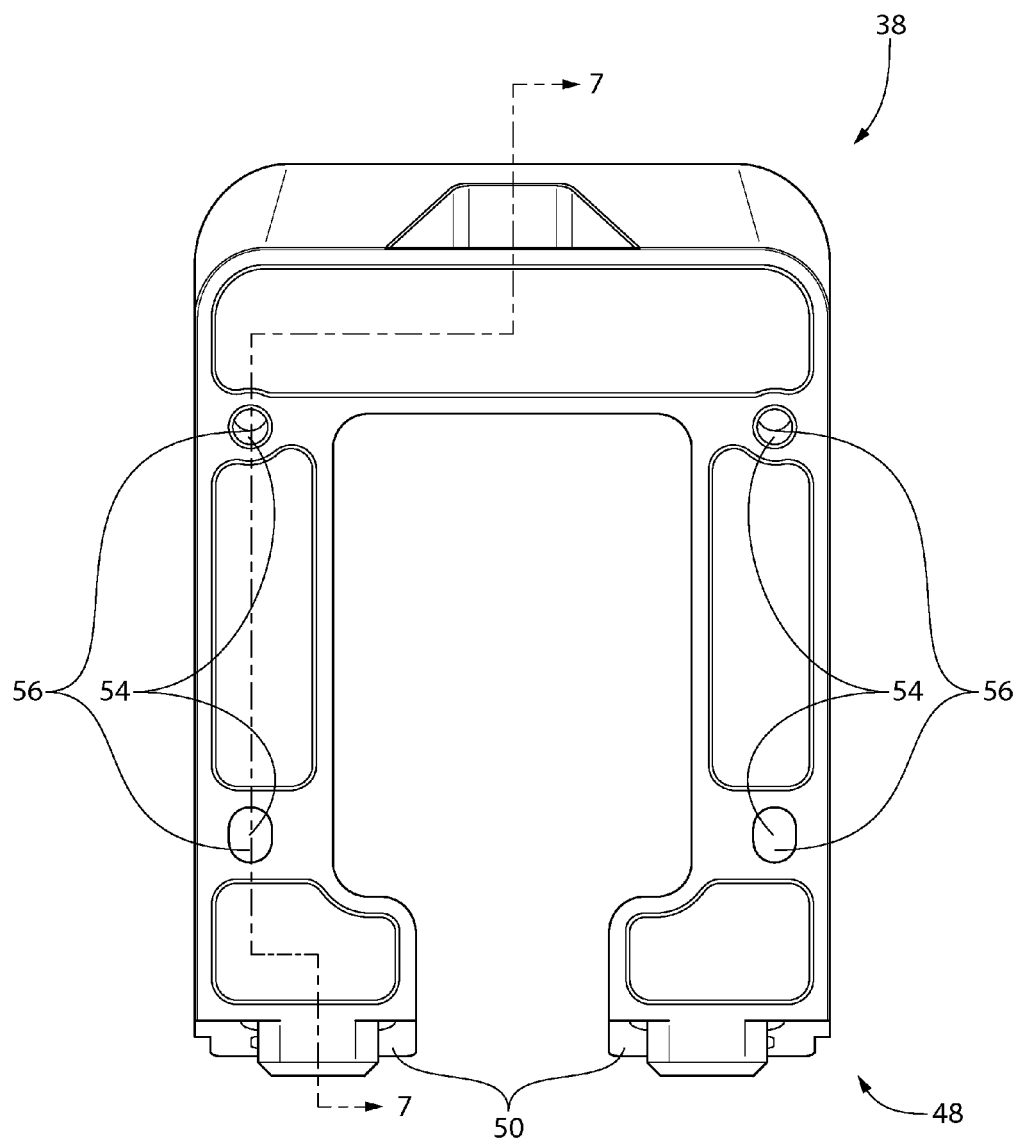
FIG. 6 is a rear elevation view of a fairing adjustment member in accordance with aspects of the present disclosure.
Figure 10:
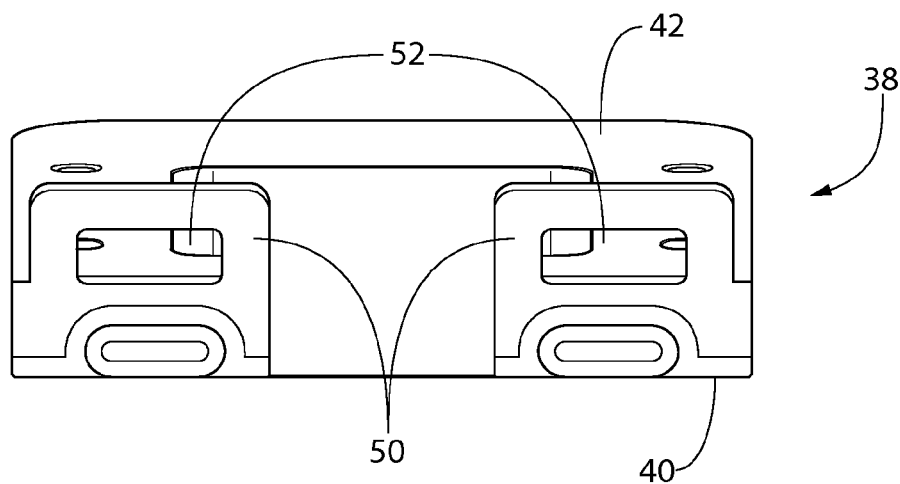
FIG. 10 is a bottom plan view of a fairing adjustment member in accordance with aspects of the present disclosure.

Referring now to FIGS. 4-10, the fairing adjustment member 38 of one or more embodiments is illustrated in detail. The fairing adjustment member 38 includes a lower support portion 48 providing vertical support for the inner fairing member 24. The lower support portion 48 includes a plurality of support members 50 extending longitudinally to provide vertical support for the inner fairing member 24. As illustrated in FIGS. 1 and 2, the support members 50 of the lower support portion 48 extend below the inner fairing member 24 of an embodiment. In an additional embodiment, the support members 50 include a plurality of depressions 52, as best shown in FIGS. 4 and 10, to enable positioning of the inner fairing member 24 relative to the fairing adjustment member 38. The plurality of depressions 52 includes one or more slots in an embodiment. The inner fairing member 24 of an embodiment includes protrusions (not shown) that fit into the depressions 52 for positioning and/or support.

Figures 7, 8:
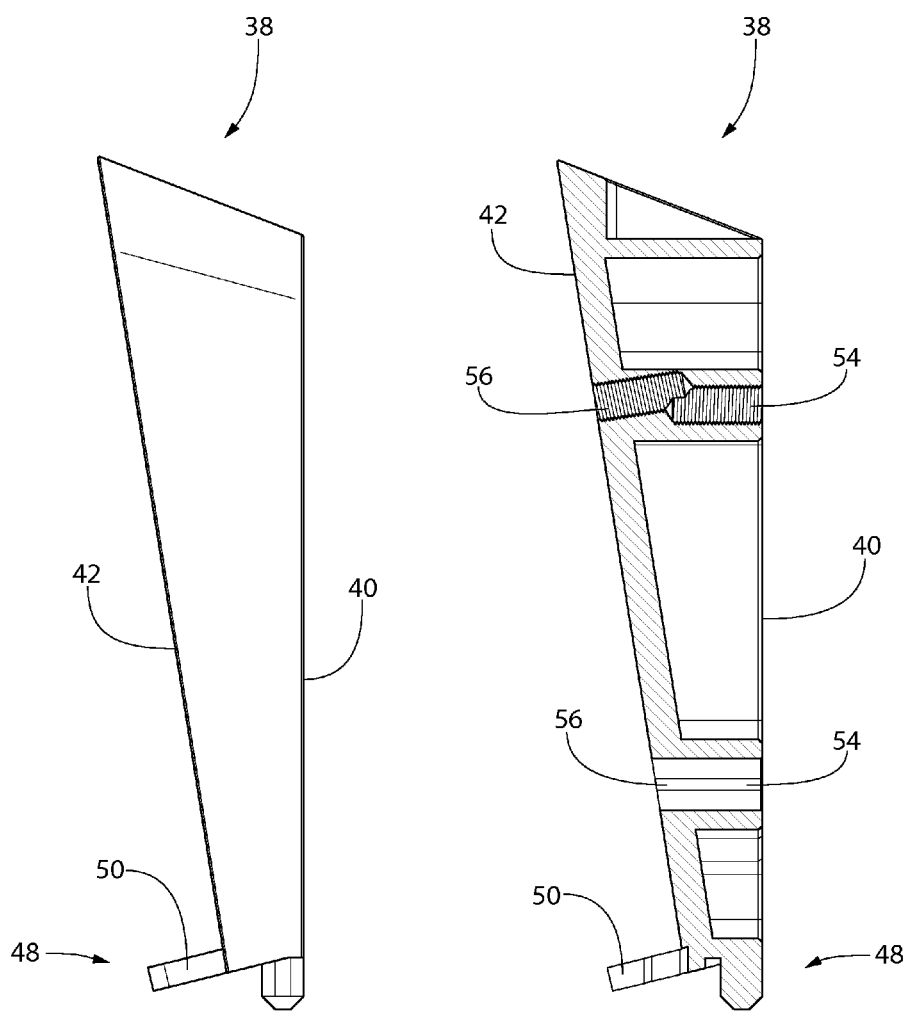
FIG. 7 is a side elevation view of a fairing adjustment member in accordance with aspects of the present disclosure.
FIG. 8 is a cross-sectional view of the fairing adjustment member depicted in FIG. 6 in accordance with aspects of the present disclosure.
Figure 9:
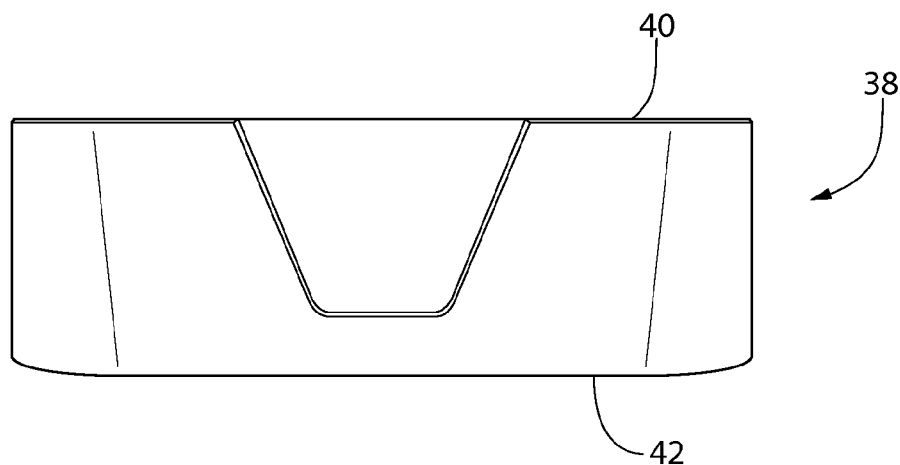
FIG. 9 is a top plan view of a fairing adjustment member in accordance with aspects of the present disclosure.

The fairing adjustment member 38 of an embodiment is coupled to the fairing bracket 30 with one or more fasteners (not shown) through one or more bracket fastener holes 54, as illustrated in FIG. 8. In one or more embodiments, the fairing adjustment member 38 is coupled to the fairing bracket 30 using other coupling means such as integral formation, welding, adhesives, or interference fitting. Additionally, the fairing adjustment member 38 of an embodiment is coupled to the inner fairing member 24 using one or more fasteners (not shown) through one or more fairing fastener holes 56, as illustrated in FIG. 8. In one or more embodiments, the fairing adjustment member 38 is coupled to the inner fairing member 24 using other coupling means such as integral formation, welding, adhesives, or interference fitting. One of ordinary skill will recognize various coupling and fastening means, and such methods and structures are included in the present disclosure with regard to any coupling operations or structures.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

I claim:

1. A motorcycle fairing adjustment assembly comprising:
a fairing bracket extending longitudinally forward from a neck portion of a motorcycle frame;
an inner fairing member disposed adjacent to the fairing bracket; and
a fairing adjustment member disposed between the fairing bracket and the inner fairing member, wherein the fairing adjustment member comprises an inner side and an outer side forming an adjustment angle adjusting an angle of the inner fairing member relative to the fairing bracket, the fairing adjustment member further comprising a lower support portion having a plurality of support members providing vertical support for the inner fairing member, the plurality of support members comprising a plurality of depressions positioning the inner fairing member relative to the fairing adjustment member.

2. The assembly of claim 1, further comprising a rake adjustment angle, wherein the rake adjustment angle corresponds with the adjustment angle of the fairing adjustment member.

3. The assembly of claim 1, wherein the outer side of the fairing adjustment member is disposed against an inner fairing member inner surface of the inner fairing member.

4. The assembly of claim 1, wherein the inner side of the fairing adjustment member is disposed against a fairing bracket outer surface of the fairing bracket.

5. The assembly of claim 1, further comprising a fairing support member disposed adjacent to an inner fairing member outer surface of an inner fairing member.

6. The assembly of claim 1, wherein the adjustment angle is 7 degrees.

7. The assembly of claim 1, wherein the adjustment angle is 9 degrees.

8. A motorcycle fairing adjustment member comprising:
an outer side configured for mounting to an inner fairing member of a motorcycle;
an inner side configured for mounting to a fairing bracket extending longitudinally forward from a neck portion of a motorcycle frame, wherein the outer side and the inner side form an adjustment angle, and the adjustment angle adjusts an angle of the inner fairing member relative to the fairing bracket; and
a lower support portion comprising a plurality of support members to provide vertical support for the inner fairing member, wherein the plurality of support members comprises a plurality of depressions positioning the inner fairing member relative to the fairing adjustment member.

9. The member of claim 8, wherein the adjustment angle of the fairing adjustment member corresponds with a rake adjustment angle.

10. The member of claim 8, wherein the outer side of the fairing adjustment member is configured to be disposed against an inner fairing member inner surface of the inner fairing member.

11. The member of claim 8, wherein the inner side of the fairing adjustment member is configured to be disposed against a fairing bracket outer surface of the fairing bracket.

12. The member of claim 8, wherein the adjustment angle is 7 degrees.

13. The member of claim 8, wherein the adjustment angle is 9 degrees.

14. A method of adjusting a motorcycle fairing comprising:
providing a fairing adjustment member having an outer side and an inner side forming an adjustment angle;
providing a fairing bracket extending longitudinally forward from a neck portion of a motorcycle frame and having a fairing bracket outer surface;
providing an inner fairing member having an inner fairing member inner surface;
coupling the fairing adjustment member to the fairing bracket at the fairing bracket outer surface;
coupling the inner fairing member to the fairing adjustment member at the inner fairing member inner surface such that an angle between the inner fairing member inner surface and the fairing bracket outer surface corresponds to the adjustment angle of the fairing adjustment member; and
adjusting a rake angle of the neck portion to form a rake adjustment angle of the neck portion, wherein the rake adjustment angle of the neck portion corresponds with the adjustment angle of the fairing adjustment member, and adjusting the rake angle of the neck portion comprises rotating the neck portion about a lateral axis.

15. The method of claim 14, wherein adjusting the rake angle of the neck portion comprises:
removing the neck portion from the motorcycle frame; and
coupling an adjusted neck portion to the motorcycle frame, wherein the adjusted neck portion includes a rake adjustment angle corresponding with the adjustment angle of the fairing adjustment member.

16. The method of claim 14, further comprising:
vertically supporting the inner fairing member with a lower support portion of the fairing adjustment member.

17. The method of claim 16, further comprising:
vertically supporting the inner fairing member with a plurality of support members at the lower support portion.

18. The method of claim 17, further comprising:
positioning the inner fairing member relative to the fairing adjustment member with a plurality of depressions in the plurality of support members.

19. A method of adjusting a motorcycle fairing comprising:
providing a fairing adjustment member having an outer side and an inner side forming an adjustment angle;
providing a fairing bracket extending longitudinally forward from a neck portion of a motorcycle frame and having a fairing bracket outer surface;
providing an inner fairing member having an inner fairing member inner surface;
coupling the fairing adjustment member to the fairing bracket at the fairing bracket outer surface;
coupling the inner fairing member to the fairing adjustment member at the inner fairing member inner surface such that an angle between the inner fairing member inner surface and the fairing bracket outer surface corresponds to the adjustment angle of the fairing adjustment member; and
adjusting a rake angle of the neck portion comprising:
removing the neck portion from the motorcycle frame; and
coupling an adjusted neck portion to the motorcycle frame, wherein the adjusted neck portion includes a rake adjustment angle corresponding with the adjustment angle of the fairing adjustment member.

20. The method of claim 19, wherein the rake adjustment angle of the neck portion corresponds with the adjustment angle of the fairing adjustment member.

21. The method of claim 19, wherein adjusting the rake angle of the neck portion comprises rotating the neck portion about a lateral axis.

22. The method of claim 19, further comprising:
vertically supporting the inner fairing member with a lower support portion of the fairing adjustment member.

23. The method of claim 19, further comprising:
vertically supporting the inner fairing member with a plurality of support members at the lower support portion.

24. The method of claim 23, further comprising:
positioning the inner fairing member relative to the fairing adjustment member with a plurality of depressions in the plurality of support members.

25. A method of adjusting a motorcycle fairing comprising:
providing a fairing adjustment member having an outer side and an inner side forming an adjustment angle;
providing a fairing bracket extending longitudinally forward from a neck portion of a motorcycle frame and having a fairing bracket outer surface;
providing an inner fairing member having an inner fairing member inner surface;
coupling the fairing adjustment member to the fairing bracket at the fairing bracket outer surface;
coupling the inner fairing member to the fairing adjustment member at the inner fairing member inner surface such that an angle between the inner fairing member inner surface and the fairing bracket outer surface corresponds to the adjustment angle of the fairing adjustment member;
vertically supporting the inner fairing member with a lower support portion of the fairing adjustment member;
vertically supporting the inner fairing member with a plurality of support members at the lower support portion; and
positioning the inner fairing member relative to the fairing adjustment member with a plurality of depressions in the plurality of support members.

26. The method of claim 25, further comprising:
adjusting a rake angle of the neck portion to form a rake adjustment angle of the neck portion, wherein the rake adjustment angle of the neck portion corresponds with the adjustment angle of the fairing adjustment member.

27. The method of claim 26, wherein adjusting the rake angle of the neck portion comprises rotating the neck portion about a lateral axis.

28. The method of claim 26, wherein adjusting the rake angle of the neck portion comprises:
removing the neck portion from the motorcycle frame; and
coupling an adjusted neck portion to the motorcycle frame, wherein the adjusted neck portion includes a rake adjustment angle corresponding with the adjustment angle of the fairing adjustment member.

* * * * *